United States Patent Office 2,973,349
Patented Feb. 28, 1961

2,973,349

POLYMERIZATION PROCESS USING A TITANIUM NITRIDE CATALYST

Frank X. Werber, Kensington, Donald F. Hoeg, Rockville, and Walter R. Wszolek, Ellicott City, Md., assignors to W. R. Grace & Co., a corporation of Connecticut No Drawing. Filed Dec. 12, 1958, Ser. No. 779,845

21 Claims. (Cl. 260—93.7)

Summarily this invention embodies a novel method of synthesizing ethylene and propylene solid polymers by subjecting the respective monomers to the action of a catalyst comprising a titanium nitride and preferably in addition comprising an aluminum tri(lower)alkyl.

The use of aluminum trialkyl per se as a catalyst to polymerize ethylene is old in the art; see U.S. 2,699,457 issued to K. Ziegler et al. The polymer product obtained therein ranges from butylene to wax-range polymers.

However, we have now found that the use of an aluminum tri(lower)alkyl in combination with titanium nitride as catalyst for ethylene and propylene polymerization results (when using ethylene) in a solid polyethylene product having a melting point above 125° C., a density in the range of about .94 to .96 and a molecular weight in excess of 10,000 weight average; and in (when using propylene) a solid polypropylene product having a melting point above 130° C. and a density in the range of about 0.87–0.89.

There are several and various methods of preparing a titanium nitride suitable for use in this invention that are well-known to the art. For example titanium nitrides are prepared by heating powdered titanium in nitrogen or ammonia at 1100 to 1300° C. Another method of preparation is the heating of titanium filaments in nitrogen. Yet another method concerns the heating of a carrier in a mixture of nitrogen and titanium halide vapors and subsequently removing the carrier by high-temperature volatilization. Another method involves heating titanium dichloride to a high temperature in an atmosphere of nitrogen. Still another method is the pyrolysis of $TiCl_4$ in the presence of ammonia.

The titanium nitrides prepared by the above known processes are, in general, interstitial compounds in which the Ti/N ratio is rarely a simple fraction. For such nitrides the formula $TiN_x$ is conveniently given, the above procedures giving $TiN_x$ where $x$ has a value between 0.5 and 1.0 inclusive. Such $TiN_x$ is suitable for use in this invention. When the term "titanium nitride" is used herein, such $TiN_x$ is meant.

The titanium nitrides formed by any of the various methods known in the art including the aforesaid can be subjected to additional treatment if desired to increase their catalyst activity. Such treatment may include a grinding or abrading step in a nitrogen or other inert atmosphere to insure fresh, active catalytic surface.

A suitable method for conserving the $TiN_x$ catalyst free of contaminants during handling and transfer to the polymerization reactor is by means of a "dry box" wherein a slight pressure of nitrogen or other inert gas, e.g., argon, is maintained.

Although the titanium nitrides are operable per se as polymerization catalysts for ethylene and propylene the use of an aluminum tri(lower) alkyl conjointly therewith is preferable for increased catalytic activity as determined by the well-known formula:

g. polymer/g. catalyst/hr.=catalyst activity as will be shown by examples infra.

The following examples will aid in understanding the invention but will in no way limit its scope.

*Example 1*

5.53 g. powdered titanium nitride, dried at 500° C., was transferred and charged under a dried nitrogen atmosphere to a mechanically stirred 1-liter autoclave equipped with gas inlet and outlet and containing 0.66 pound of cyclohexane. Agitation was commenced and the slurry heated to about 140° C. and pressured with ethylene to 545 p.s.i.g. While maintaining the temperature in at about 140° C. during the 2¼ hour run the pressure varied in a range of about 550–700 p.s.i.g. due to repressuring with ethylene throughout the run. After cooling and venting, the yield of crude solid polymer (containing catalyst) was 6.5 gms.

*Example 2*

Using the equipment of Example 1, 7.62 g. dried titanium nitride was charged under a dry nitrogen atmosphere to the autoclave containing 0.66 lb. of dry cyclohexane. To the slurry was added 7 ml. of triisobutyl aluminum by means of a syringe. All reactants were maintained free from air and moisture. Upon addition of the triisobutyl aluminum to the slurry no exotherm occurred. Agitation was initiated and the autoclave heated to about 92° C. while being pressured to 225 p.s.i. with ethylene. After about 1¾ hours at temperatures ranging from 75–100° C. and pressures in the range 225–300 p.s.i. the run was stopped and the autoclave cooled and vented. A yield of 16 g. of crude solid polymer (containing catalyst) was obtained.

*Example 3*

30 g. of titanium nitride were charged to a stainless steel ball mill about ⅓ full of ⅜″ stainless steel balls. The charge was milled under an inert (argon) atmosphere for 15 hours. The charge was removed in a "dry box" maintained under a slight pressure of argon and stored in a vial under argon prior to removal from the dry box. The thus-milled titanium nitride with or without an aluminum tri(lower)alkyl is capable of polymerizing ethylene or propylene by the process of this invention.

*Example 4*

Using the same equipment as in Example 1, 4.02 g. of titanium nitride from Example 3 were charged to the autoclave under an inert atmosphere. 300 ml. of pure dry cyclohexane and 9 g. triisobutyl aluminum were added and the autoclave sealed. Agitation was commenced and heat was applied until a temperature of about 58° C. was obtained whereupon propylene was admitted at a pressure of 130 p.s.i.g. When the temperature reached 64° C. the propylene gas inlet was closed. Subsequent heating to about 90° C. increased the autoclave pressure to about 200 p.s.i. After 3 hours the run was discontinued and the autoclave cooled and vented. A yield of 5 g. of rubbery solid propylene polymer was obtained.

Although the aluminum trialkyl used in the examples was triisobutyl aluminum, the aluminum tri(lower)alkyls in general are operative with titanium nitride to catalyze the polymerization of ethylene and propylene. Such other aluminum trialkyls include trimethyl, triethyl, tripropyl, triisopropyl, tributyl, triamyl, triisoamyl, trihexyl, triisohexyl, triheptyl and trioctyl aluminum.

The ratio of aluminum trialkyl to titanium nitride is not critical. The use of relatively small amounts of aluminum trialkyl will cause some increase in catalytic activity of the titanium nitride. Mole ratios of aluminum trialkyl : titanium nitride of 0.1–20:1 are operative; a preferred range is 0.5–3:1.

The amount of catalyst that can be used to effect a polymerization can vary considerably. Relatively small amounts of titanium nitride are operable to form relatively large amounts of polymer. In general a suitable range is 0.001–10.0 grams of titanium nitride per gram of ethylene or per gram of propylene charged. Even larger amounts of catalyst are operable but occasionally present a purification problem.

In practicing this invention it has been found that pressures of at least 100 p.s.i. for ethylene and 30 p.s.i. for propylene are desirable to cause the reaction to proceed. Preferably, however, a pressure of at least 450 p.s.i. or higher for ethylene and at least 100 p.s.i. or higher for propylene is maintained.

Although the reaction can be performed at relatively high pressures, e.g. 5,000 p.s.i. and higher, the additional expense of equipment required to withstand such pressures in general outweighs the increased polymer yields and/or shorter reaction times.

A reaction temperature in the range 10 to 300° C. for both ethylene and for propylene is workable. Preferably 25 to 250° C. is adequate for either monomer. For practical purposes a reaction temperature in the range 150–200° C. and ethylene pressures in the range of 400–1000 p.s.i. are preferred whereas for propylene a temperature range of 50 to 150° C. and a pressure of 100–500 p.s.i. is preferred.

As a reaction menstruum, substantially any inert material can be used which is liquid under the conditions of temperature and pressure employed and which has a solvent action on ethylene and propylene. These solvents are well-known to those in the art. The liquid hydrocarbon solvents are preferred, and are preferably substantially free of materials that react with or deactivate the catalyst, e.g., water, $CO_2$, $O_2$, acetylene, $NH_3$, and ethers, ketones and similarly reactive compounds. Suitable solvents include pentane, hexane, heptane, cyclohexane, octane, benzene, xylene, toluene, and the like.

Uses of the products of this invention are many and varied. The polyethylene produced by this invention has the same uses as that produced by the prior art including film, filament, pipe, molded and extruded articles, e.g., tubes, bottles, and containers. The polypropylene produced by practicing this invention has uses similar to that produced by the prior art such as paper coating and clarity improver in isotactic polypropylene film.

The polypropylene made by the process of this invention can be used, for example, in paper coating by conventional techniques. A suitable method of paper coating with our polypropylene is by extrusion of a thin film at 450–500° F. directly to the paper as the paper passes under the extruding head. By proper handling of the liquid or semi-liquid resin at elevated temperatures to prevent oxidation and decomposition, polyethylene may also be applied by these methods. Paper thus coated is used in multiwall paper bags, as liners for large fiber drums, for wrappings for frozen foods, and other like applications. It has excellent water-vapor and water resistance and a high degree of chemical resistance, is stronger than plain paper, and will retain its flexibility at extremely low temperatures.

We claim:

1. The method of polymerizing a monomer of the group consisting of ethylene and propylene to a normally solid polymer that comprises subjecting the respective monomer in a liquid hydrocarbon reaction medium under superatmospheric pressure to the action of a catalyst consisting essentially of titanium nitride.

2. The process according to claim 1 wherein the ethylene pressure is greater than 100 p.s.i.

3. The process according to claim 1 wherein the ethylene pressure is 400 to 1000 p.s.i.

4. The process according to claim 1 wherein the propylene pressure is greater than 30 p.s.i.

5. The process according to claim 1 wherein the propylene pressure is 100 to 500 p.s.i.

6. The process according to claim 1 wherein the ethylene polymerization reaction is performed within the temperature range of 10 to 300° C.

7. The process according to claim 1 wherein the propylene polymerization reaction is performed within the temperature range of 10 to 300° C.

8. The process according to claim 1 wherein the reaction medium is cyclohexane.

9. The process according to claim 1 wherein the catalyst also contains an aluminum tri(lower)alkyl.

10. The process according to claim 9 wherein the aluminum tri(lower)alkyl is aluminum triisobutyl.

11. The process of forming normally solid polymers of ethylene that comprises subjecting ethylene under a pressure in the range of 400 to 1000 p.s.i. and a temperature range of 10 to 300° C. in a cyclohexane solvent to the action of a catalyst consisting essentially of titanium nitride.

12. The process according to claim 11 wherein the ethylene pressure is about 550–700 p.s.i., and the temperature is about 140° C.

13. The process according to claim 11 wherein the catalyst also contains an aluminum tri(lower)alkyl.

14. The process according to claim 13 wherein the aluminum tri(lower)alkyl is aluminum triisobutyl.

15. The process according to claim 13 wherein the aluminum tri(lower)alkyl is aluminum triethyl.

16. The process of forming normally solid polymers of propylene that comprises subjecting propylene under a pressure in the range of 100 to 500 p.s.i. and a temperature range of 10 to 300° C. in a cyclohexane solvent to the action of a catalyst consisting essentially of titanium nitride.

17. The method according to claim 16 in which the catalyst also contains an aluminum tri(lower)alkyl.

18. The process according to claim 17 wherein the propylene pressure is about 200 p.s.i. and the temperature is about 90° C.

19. The process according to claim 18 wherein the catalyst also contains titanium nitride and aluminum triisobutyl.

20. The method of polymerizing ethylene to a normally solid polymer that comprises subjecting ethylene in an inert solvent under a pressure of about 550–700 p.s.i. and at a temperature of about 140° C. to the action of a catalyst consisting essentially of titanium nitride.

21. The method of polymerizing ethylene to a normally solid polymer that comprises subjecting ethylene in an inert solvent under a pressure in the range 225–300 p.s.i. and a temperature in the range of about 75–100° C. to the action of a catalyst consisting essentially of titanium nitride in combination with triisobutyl aluminum.

References Cited in the file of this patent

UNITED STATES PATENTS

| | | |
|---|---|---|
| 2,413,778 | Olson | Jan. 7, 1947 |
| 2,898,193 | Espenschied | Aug. 4, 1959 |